United States Patent [19]

Geilhufe et al.

[11] 3,848,237

[45] Nov. 12, 1974

[54] HIGH SPEED MOS RANDOM ACCESS READ/WRITE MEMORY DEVICE

[75] Inventors: Michael Geilhufe, Los Gatos; Rustam Jehangir Mehta, Sunnyvale, both of Calif.

[73] Assignee: Advanced Memory Systems, Sunnyvale, Calif.

[22] Filed: Feb. 20, 1973

[21] Appl. No.: 334,140

[52] U.S. Cl.... 340/173 R, 340/173 DR, 340/172.5, 307/238

[51] Int. Cl. ............................................ G11c 11/40

[58] Field of Search .................. 340/172.5, 173 DR

[56] References Cited

UNITED STATES PATENTS 3,731,287 5/1973 Seely .......................... 340/173 DR

*Primary Examiner*—Terrell W. Fears

*Attorney, Agent, or Firm*—Spensley, Horn & Lubitz

[57] ABSTRACT

A Random Access Read/Write Memory utilizing field effect devices having a matrix of three field effect device memory cells, data control cells and buffer circuitry for signal conditioning and TTL buffering. The memory utilizes a unique voltage source circuit which provides TTL compatability even when using high threshold field effect device processing in the formation of the integrated circuit read/write memory. Other unique features include a unique exclusive OR circuit for the data write driver and the sense circuit and a special circuit to decrease the response time of the read output line.

32 Claims, 22 Drawing Figures

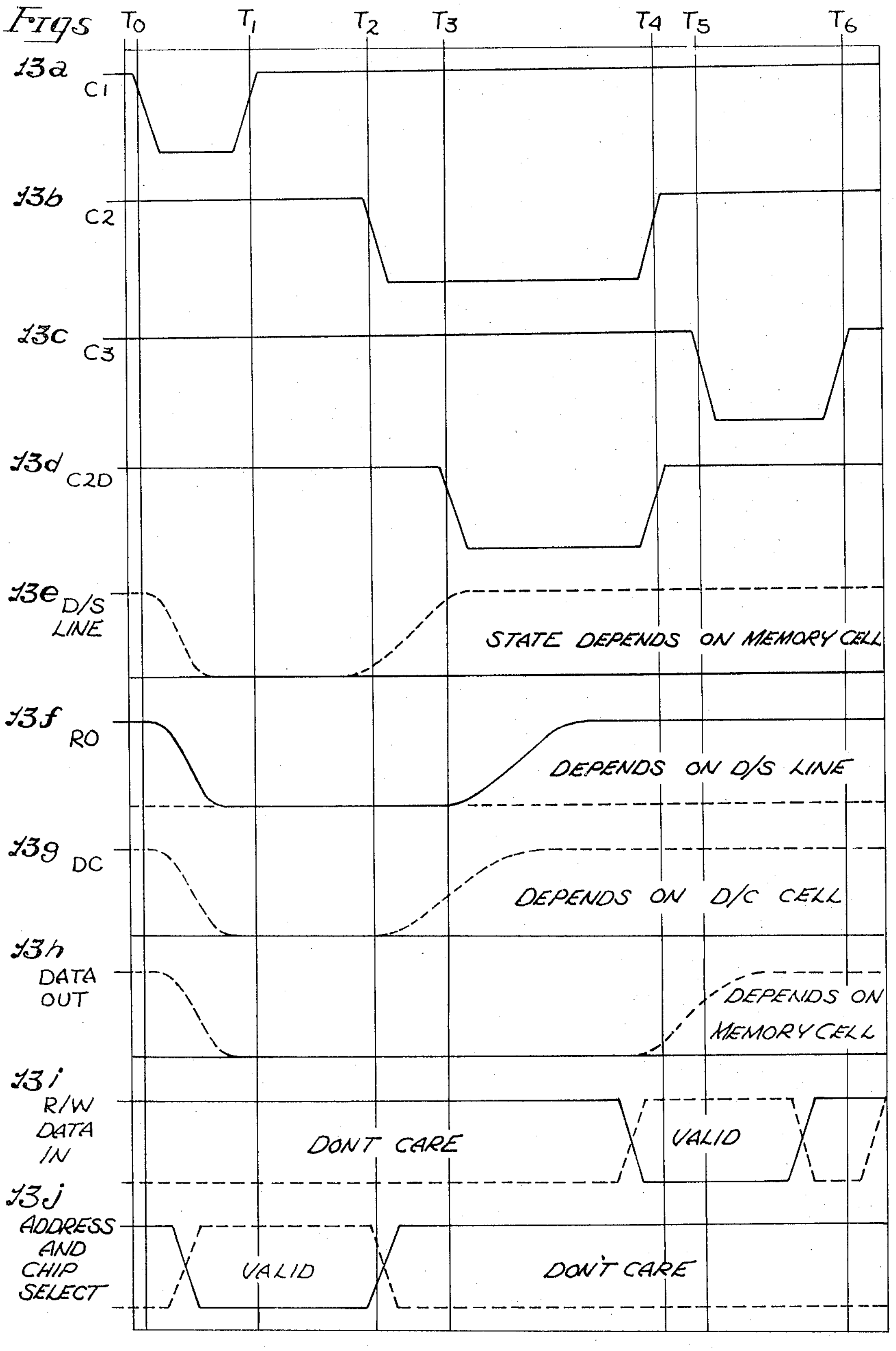
Figs
T0
T1
T2
T3
T4
T5
T6
13a
C1
13b
C2
13c
C3
13d
C2D
13e
D/S LINE
STATE DEPENDS ON MEMORY CELL
13f
RO
DEPENDS ON D/S LINE
13g
DC
DEPENDS ON D/C CELL
13h
DATA OUT
DEPENDS ON MEMORY CELL
13i
R/W DATA IN
DONT CARE
VALID
13j
ADDRESS AND CHIP SELECT
VALID
DON'T CARE

HIGH SPEED MOS RANDOM ACCESS READ/WRITE MEMORY DEVICE

BACKGROUND OF THE INVENTION

1. Field of the Invention

This invention relates to the field of memory circuits, and particularly to integrated memory circuits utilizing field effect devices.

2. Prior Art

Memory matrices using various types of data storage cells are well known in the prior art, as are various buffer and support circuits therefor. Of particular interest to the present invention are what are commonly referred to as MOS field effect device memories. The designation MOS technically stands for a field effect device having a metal gat insulated from the silicon substrate by an oxide layer. More recent developments in the field have included silicon gate devices, and may further include an insulating layer such as silicon nitride as opposed to an oxide layer. Thus, the terms MOS device and field effect device, as they may be used herein, are used in a general or generic sense to indicate the general class of devices which may otherwise be referred to as insulated gate devices and/or surface effect devices. Both enhancement mode and depletion mode devices are included. Similarly, terms such as insulated gate devices, etc. may be used to also indicate this broad category of devices, as such terms are now commonly used in this broader sense. Such devices are usually physically characterized as having first and second regions of a first conductivity type separated by an intermediate region of the second conductivity type over which there is a conductive gate electrically separated or insulated from the intermediate region. By applying a voltage of the proper polarity to the gate, the surface of the intermediate region is effectively caused to change conductivity type between the first and second regions. Thus the gate is characterized as being substantially insulated from the substrate, though having a significant capacity both with respect to the first and second regions and particularly with respect to the substrate. The conductivity between the fitst and second regions is primarily a function of the gate voltage (as well as device size and geometry). In this regard, there is a threshold voltage for the gate which essentially separates the conductive and nonconductive conditions between the first and second regions. The threshold voltage in turn is strongly dependent upon the particular processing used to fabricate the field effect device. The higher threshold voltage devices are particularly desirable for use in memory systems since in practice it has been found that the integrated circuits are easier to fabricate and the yields obtained are considerably higher than when lower threshold devices are used.

However, devices having a relatively high threshold voltage are also subject to higher absolute variation of the threshold voltage, a problem which heretofore has presented the use of the higher threshold devices in TTL compatable memory devices. Since the threshold voltage is dependent upon the fabrication processing, all field effect devices in a given integrated circuit will have substantially the same threshold voltage. However, the circuit to circuit variation, and particularly the batch to batch variation in threshold voltage for the higher threshold devices may be quite substantial, thereby throwing the logic voltages for the inputs to the buffer circuitry of prior art field effect read/write random access memory integrated circuits out of the TTL logic levels.

It should be noted that because of the extremely high DC impedance of the gate and the significant capacitance thereof, as well as capacitance associated with the various lines and other circuit components connected to the gate and first and second regions, the gate of a field effect device will tend to remain at a given voltage differential with respect to the first and second regions until driven to a second voltage differential, at least within a relatively short time period characteristic of memory access and read/write times. Thus, many field effect device memories are comprised of memory cells each generally utilizing a plurality of field effect devices generally arranged so as to store data as a result of the stored charges in the field effect devices and the various interconnections thereto. It is this type of memory system to which the preferred embodiment of the present invention is directed, though certain aspects of the present invention are generally applicable to field effect buffer circuits, both within and without the field of memory systems in general.

BRIEF SUMMARY OF THE INVENTION

A Random Access Read/Write Memory utilizing field effect devices having a matrix of three field effect device memory cells, a row of data control cells and various buffer circuitry for signal conditioning and TTL buffering. The memory utilizes a unique voltage source circuit which provides TTL camptability even when using high threshold field effect device processing in the formation of the integrated circuit read/write memory. This voltage source circuit generates a voltage which is dependent upon the threshold voltage characteristic of the MOS devices in the memory so that, by applying this voltage to one region of the input device for the TTL logic signal, the effect of the threshold of that device is cancelled by the offsetting threshold dependence of the output of the voltage source. Other unique features include a unique exclusive OR circuit for the data write driver and the sense circuit, and a special circuit to decrease the response time of the read output line. The exclusive OR function is effectively performed by a two device circuit, providing a very short response time. The response time of the read output line is substantially decreased by a trigger circuit which senses the initial change in state of the read output line and provides a pull-up or bigger effect to rapidly drive the state of the line to the state indicated by the initial change.

BRIEF DESCRIPTION OF THE DRAWINGS

FIGS. 13*a* through 13*j* are wave form diagrams to illustrate the typical wave forms or various signals applied to, internally existing, and received from the memory of the present invention.

DETAILED DESCRIPTION OF THE INVENTION

Figure 1:
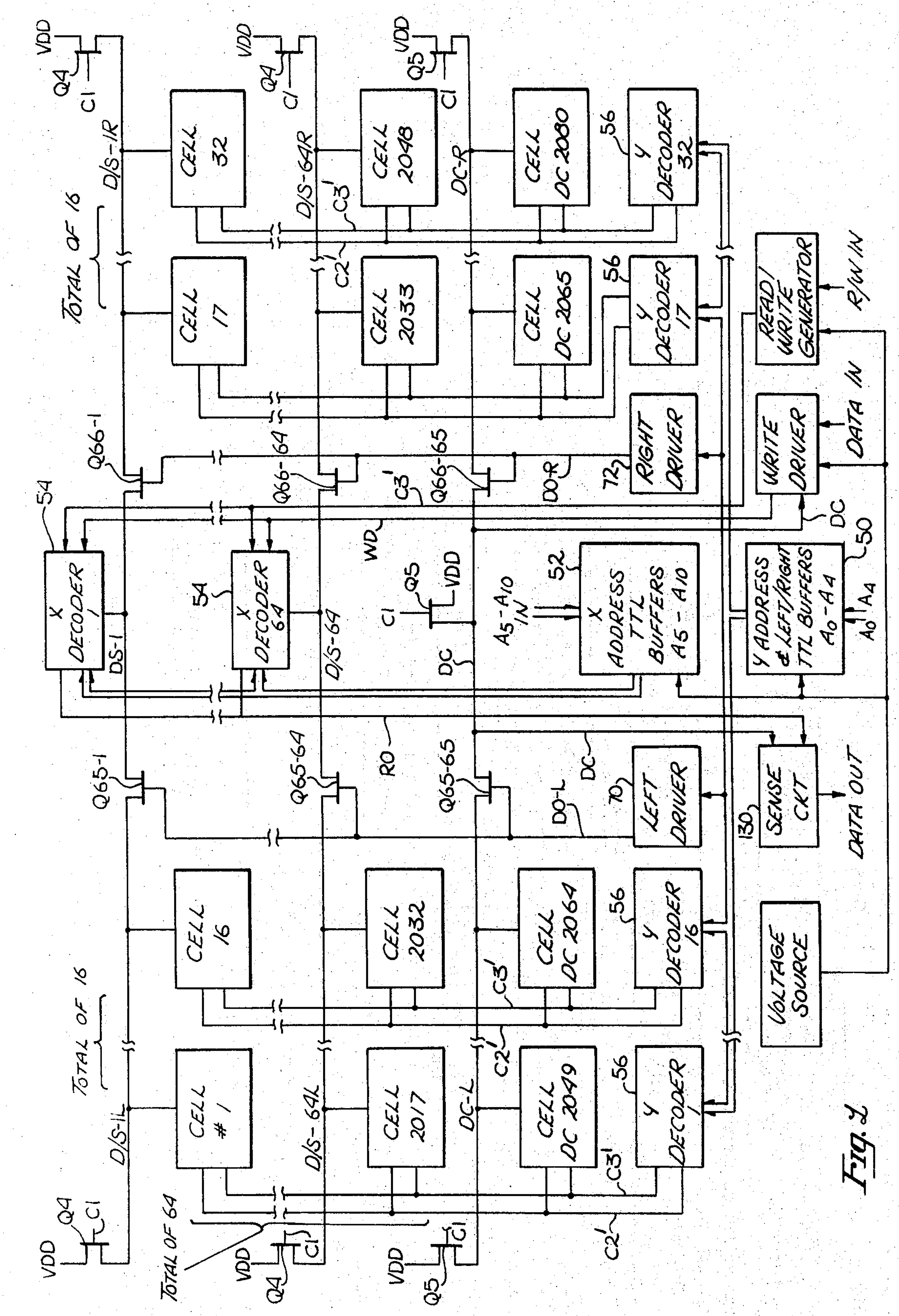
FIG. 1 is a block diagram of the general organization of the preferred embodiment of the present invention.
Figures 2, 3, 4:
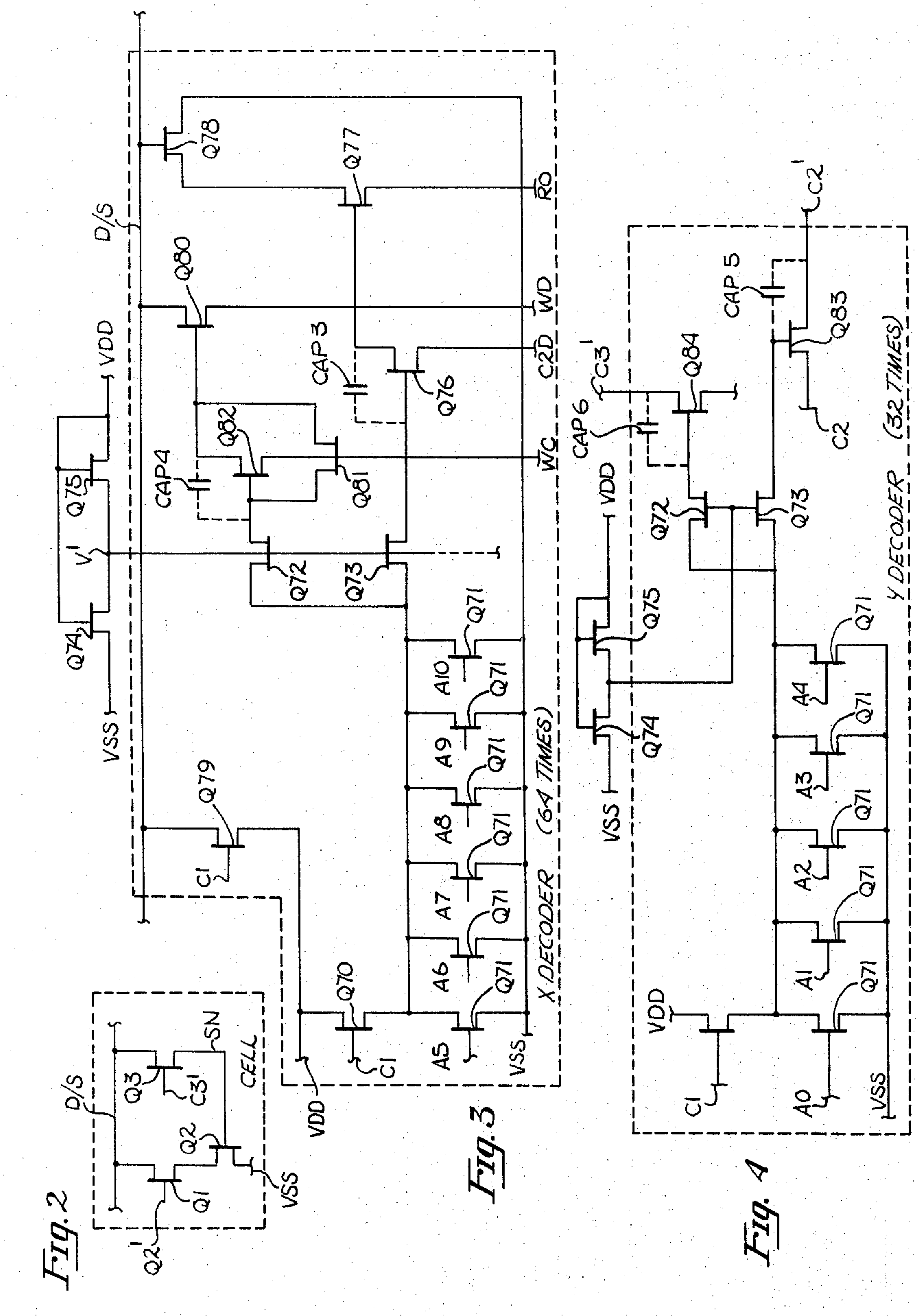
FIG. 2 is a circuit diagram for the basic cell of each memory cell and each data control cell in the circuit of FIG. 1.
FIG. 3 is a typical circuit diagram for the X decoders together with the V′ generator used in conjunction with all X decoders.
FIG. 4 is a typical Y decoder circuit diagram for the Y decoders together with a V′ generator used in conjunction with all of the Y decoders.

First referring to FIGS. 1 and 2, a block diagram showing the general organization of the preferred embodiment of the present invention and a memory cell circuit for the memory cells shown in FIG. 1, respectively, may be seen. The embodiment shown in FIG. 1 is a 2,048 bit field effect device memory complete with buffer circuitry to interface with TTL input and output logic levels. The memory has an apparent external organization of 2,048 by 1 bit, with 2,048 individual memory cells arranged with 32 cells in each row, with 64 such rows so as to result in an apparent internal 32 by 64 arrangement. In addition, there is a data control memory cell row of 32 cells forming the 65th row of cells, the function of which will be subsequently described herein. The data control memory cells (Cell DC 2049 through Cell DC 2080) are identical to the memory cell (Cell 1 through Cell 2048) shown specifically in the circuit of FIG. 2.

The preferred embodiment about to be described herein is fabricated using P channel metal gate field effect devices. Specifically, such devices may be characterized as having first and second regions diffused into the surface of a semiconductor substrate with a metal gate disposed on an insulator over the region separating the first and second region. The electrical conductivity between the first and second regions is controllable by the voltage on the gate, and for P channel devices, a high state voltage on the channel results in a very high impedance between the first and second regions, whereas a low state voltage on the gate results in a reasonably low impedance conduction path between the first and second regions. (This socalled on impedance of a field effect device, while being reasonable low, is characteristically much higher than the on impedance of junction transistors).

Now referring specifically to FIG. 2, the operation of an individual cell will be described. The cells are comprised of three devices Q1, Q2 and Q3. The first region of devices Q1 and Q3 are coupled to a line which shall be referred to herein as a D/S line. The second region of device Q1 is coupled to the first region of device Q2, with the second region of that device being coupled to the power supply terminal identified herein as the VSS (Vss for the P channel device circuit would be a positive voltage with respect to the other main power supply terminal, hereinafter identified as VDD, so that a voltage in the vicinity of VSS would represent the high state voltage, whereas a voltage in the vicinity of VDD would represent a low state voltage, in terms of the circuit logic levels). The gate of device Q1 is coupled to a clock signal which shall be identified herein as C2' and the gate of device Q3 is coupled to another clock signal identified herein as C3' (as shall subsequently be seen, the prime indicates a decoded clock signal, only occurring in the addressed column). When the clock signal, C3' is in the high state, device Q3 is off with the first and second regions of device Q3 then being substantially insulated from each other. Accordingly, the storage node SN comprising the gate device Q2, the second region of device Q3 and the line connecting those two regions is effectively insulated from the rest of the circuit, thereby allowing storage of a charge on the storage node representing either the high or the low states. While the insulation of the storage node is not perfect a charge representing either the high or the low state may be stored for a length of time which is large in comparison with the operating cycle of the memory, and may be occasionally refreshed as subsequently described so that the state does not inadvertently change unless commanded.

Now referring to FIGS. 13*a* through 13*c*, the timing signals for the first, second and third clock signals, C1, C2 and C3 may be seen. The clock signals C1 and C2, as shall subsequently be more fully described, are required to execute a read operation, whereas the additional clock signal C3, though not interfering with a read command, is required for the execution of a write command. (The clock signals C1, C2 and C3 are externally generated signals and are applied to the integrated circuit memory device of the present invention through the input terminals thereof).

The time TO the clock signal C1 goes to the low state. This turns on a plurality of devices in the memory circuit to precharge various lines therein. By way of example, in FIG. 1 devices Q4 are turned on by the clock signal C1 to precharge the left and right data sense lines, such as D/S 1L and D/S 1R, etc. to the low state. Similarly, devices Q5 are turned on by the clock signal C1, and the left and right data control lines DC-L and DC-R, as well as the central portion identified merely by DC, are similarly precharged to the low state. Thus, the data sense line in general, identified in FIG. 2 as D/S is charged to the low state by the first clock signal. Also, for the column of memory cells and for the single data control cell in that column, the second clock signal C2 will be provided to the gate of device Q1 as a decoded clock signal C2'. This turns on device Q1. If the storage node SN of a respective cell is in the low state, device Q2 will be on. Thus, when the decoded clock signal C2' goes to the low state, both devices Q1 and Q2 for that cell will be on, thereby changing the state of the data sense line D/S for that portion of a row (e.g. left or right segment) to the high state (e.g. approximately VSS). On the other hand, if the storage node is in the high state, device Q2 will be off so that the data sense line D/S will remain in the low state even when device Q1 is turned on.

It should be noted from the above that for the column of memory cells and the data control cell in that column, the states of the various respective data sense line segments D/S and the respective data control line segments D/C, shortly after time T2 (e.g. T3 to be defined), are each opposite to the states of the corresponding storage node of the respective cell, that is, if the data sense lines segment D/S is in a first state the storage node SN for the respective cell in the addressed column will be in the second state.

At time T4 the second clock signal C3 will go to the low state. The second clock signal will be coupled through decoders to provide a decoded clock signal C3', which is coupled to the base of device Q3. Accordingly, for the addressed column, device Q3 will be turned on. Since the capacitance of the data sense line segment D/S is much higher than the capacitance of the storage node for any one cell, the storage node is forced into the opposite state by the turning on of device Q3. Thus it may be seen that for the addressed column the occurrence of the third clock signal C3 (and accordingly the decoded clock signal C3'), the logic state of all cells in the column, as represented by the state of the storage nodes, will be changed, e.g. the state of all cells will be inverted, including the data control cell. It is for this purpose that the data control cell in each column is provided, that is, so as to maintain a reference with respect to which the state of each of the cells in the column may be compared to determine the information stored therein. For the 31 of the 32 columns, which are not addressed at any particular time during a memory cycle, the decoded clock signals C2' and C3' will not be coupled thereto, and accordingly the state of the storage nodes in these cells will not be changed.

It may be seen that for an addressed column the occurrence of the first clock signal C1 followed by the second and third clock signals C2 and C3 will result in the refreshing of every cell in that column, since such an occurrence forces the storage nodes to particular states. Thus, while the memory is a dynamic memory, it may be refreshed by sequentially addressing each column followed by the proper occurrence of the clock signals.

Figure 6:
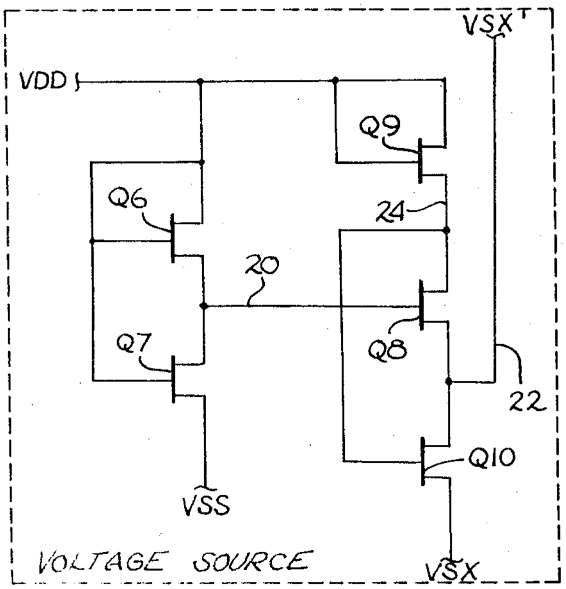
FIG. 6 is a circuit diagram for the voltage source which in part provides for the TTL compatability of various circuits in the present invention, independent of the threshold value of the MOS devices used therein.

Now referring to FIG. 6, one very important aspect of the present invention may be seen. The specific circuit shown therein is referred to as a voltage source circuit. The purpose of this circuit is to receive a reference input voltage VSX and to provide a variable reference voltage VSX' to various buffer circuits so as to maintain the desired TTL switching levels for the buffer input devices, independent of reasonable variation in the threshold voltage of these devices. Accordingly, devices Q6 and Q7 are coupled in series between the power supply terminals VDD and VSS. The gates of devices Q6 and Q7 are both coupled to VDD, thereby maintaining both devices in the on condition. As previously mentioned, field effect devices characteristically have a significant impedance when in the on condition so that two devices coupled in series between the power supply terminals may be maintained in the on condition to form a voltage divider without excessive power dissipation in either of the devices. Thus, devices Q6 and Q7 form a voltage divider with the divided voltage on line 20 applied to the gate of device Q8. In series with device Q8 are two additional devices Q9 and Q10, with device Q9 being maintained in the on condition by the coupling of its gate to the power supply terminal VDD. Device Q8 is connected so as to perform a function similar to the well known emitter follower function of junction transistors. Thus, the voltage VSX' on line 22 will equal the voltage on line 20 plus the threshold voltage of device Q8. Since the voltage on line 20 is some predetermined fraction of the power supply voltage, the voltage VSX' from circuit to circuit will vary depending upon the threshold voltage of the device Q8. Since the threshold voltage and particularly, the variation thereof is primarily effected by processing, the threshold voltage of device Q8 is generally reflective of the threshold voltage of the other field effect devices throughout a particular integrated circuit.

Because of the finite impedance of the various devices in the circuit of FIG. 6, the voltage VSX' will be subject to some variation due to variations in the loading thereon. To minimize these variations, device Q10 is provided with its gate coupled to line 24 joining the second region of device Q9 with the first region of device Q8. This maintains device Q10 in an at least partially on condition. Accordingly, as the current demands on the VSX' output of the voltage source circuit increase, the voltage drop across device Q9 increases. Thus, the voltage variation on line 24 caused by the change in loading is fed back to the gate of device Q10, driving that device further toward the on condition so as to tend to compensate for the change in load. Accordingly, the feedback to device Q10 tends to minimize the effective output impedance of the voltage source circuit for the signal VSX' so as to minimize variations thereof.

Figure 7:
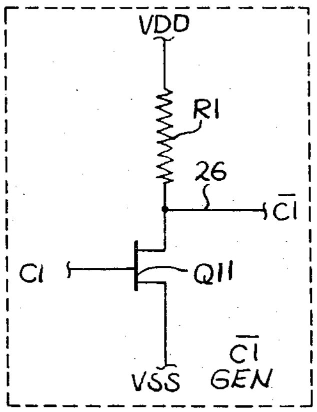
FIG. 7 is a circuit diagram for the $\overline{C1}$ generator circuit which generates the logical inverse of the first clock signal C1.

Now referring to FIG. 7, the inverter circuit for the first clock signal C1 may be seen. This circuit is comprised of a field effect device Q11 coupled in series with a resistor R1 between the power supply terminal VDD and VSS. The first clock signal C1 is applied to the gate of device Q1, providing an output on line 26, generally indicated as $\overline{C1}$, which is the logical inverse of the first clock signal C1.

Figure 5:
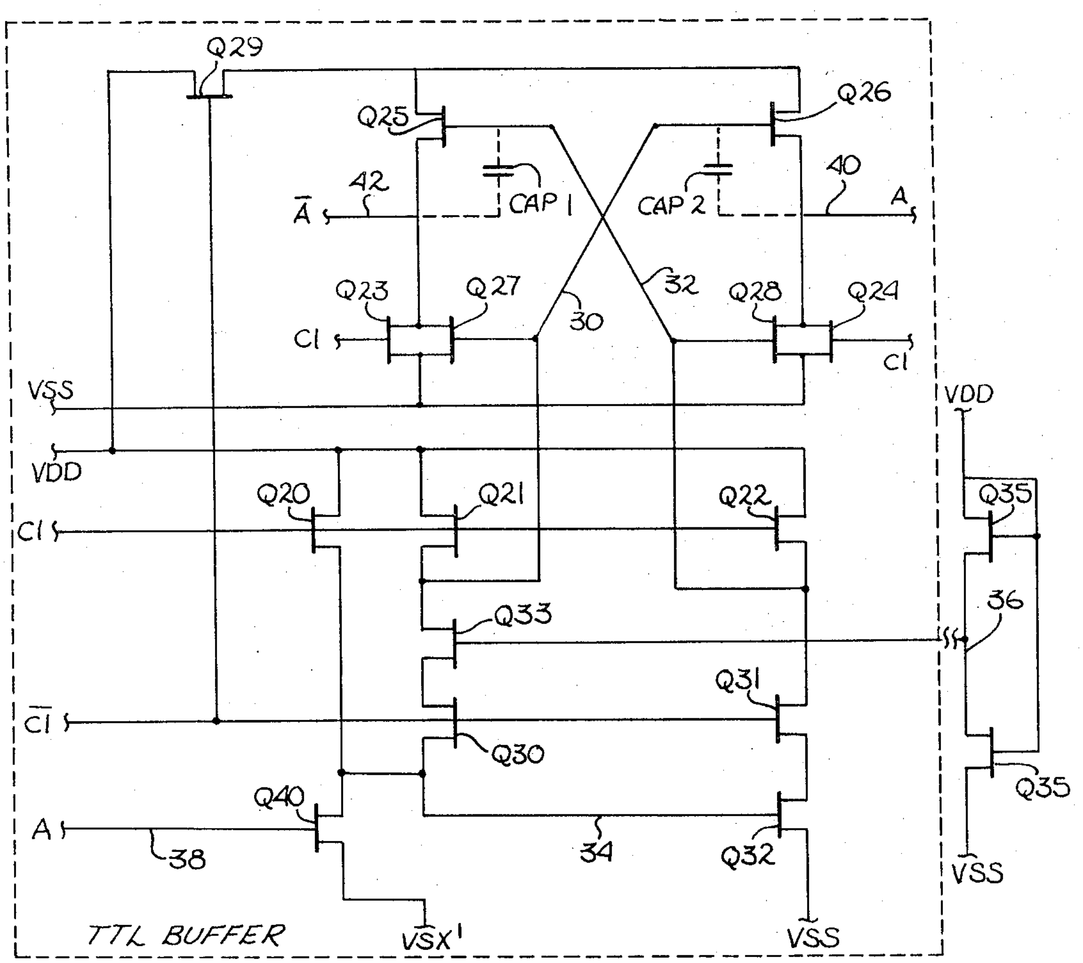
FIG. 5 is a typical circuit diagram for the TTL buffers together with a reference voltage generator used in conjunction with all of the TTL buffers, which voltage reference generator performs in a manner similar to the V' generator shown in FIG. 3.

Now referring to FIG. 5, a typical TTL address buffer circuit, as is used for each bit of the ten bit address signal, may be seen. At time TO the first clock signal C1 goes to the low state, thereby turning on devices Q20, Q21, Q22, Q23 and Q24. Thus, lines 30 and 32 coupled to the gates of devices Q26 and Q25 respectively are forced to the low state, thereby turning on those two devices and further turning on devices Q27 and Q28. At the same time, the inverse of the signal $\overline{C1}$ (e.g. C1) goes to the high state, thereby turning off devices Q29, Q30 and Q31. Since device Q20 is on and since Q40 and Q20 form an inverter circuit, line 34 will be forced into a state opposite to that of TTL input line 38. Line 34 is coupled to the gate of device Q32, thereby either turning on device Q32 or turning off device 32.

For the 2,048 bit memory, a full address is comprised of a ten bit address. Thus 10 TTL buffers as shown in FIG. 5 are used for the buffering of these address signals. The device Q33 of each TTL buffer is coupled to a single voltage reference circuit comprised of devices Q34 and Q35 coupled in series between the power supply terminals VDD and VSS. The gates of devices Q34 and Q35 are coupled to the negative power supply terminal VDD so as to maintain these two devices in the on condition. Thus, as shown, the gates of devices Q33 of all the TTL buffers are coupled in common to a reference voltage on line 36 generated by the voltage divider. Device Q34 is selected to have a much lower on impedance than device Q35 so that the voltage on line 36 and on the gates of devices Q30 is normally in the vicinity of VDD, the negative voltage, thereby generally maintaining devices Q30 in the on condition in each of the TTL buffers. Accordingly, in the time interval between time TO and time T1 devices Q29, Q30 and Q31 are in the off condition and all other devices in the circuit shown in FIG. 5 are in the on condition. Also, line 34 is in a state opposite to that of the TTL input line 38.

At time T1, first clock signal C1 returns to the high state, and accordingly the inverse thereof $\overline{C1}$ goes to the low state. This turns off device Q20, and unless the address signal A applied to the gate of device Q40 is in the low state, thereby coupling line 34 through device Q40 to the voltage source VSX', line 34 will be in the low state. Thus device Q32 remains on. On the other hand, devices Q20, Q21, Q22, Q23 and Q24 are turned off. Since devices Q31 and Q32 are both on, line 32 is coupled to VSS, the positive power supply terminal, driving line 32 to the high state and turning off devices Q25 and Q28. At the same time, since line 34 was in the low state and devices Q30 and Q33 are both on, line 30 will be maintained in the low state, thereby turning on devices Q26 and Q27. Also, device Q29 is turned on by the $\overline{C1}$ signal so as to apply the power supply voltage to devices Q25 and Q26. Since Q25 and off are driven to the off condition as Q26 and Q27 are maintained in the on condition, the signal on line 40, identified as an address signal A, will be in the low state, whereas the inverse thereof on line 42, identified as A, will be in the high state. Capacitor CAP2 between the gate and second region of device Q26, indicated in phantom in FIG. 5, provides extra drive to line 30 as a result of the change in line 40 from the high state to the low state at time T1 so as to rapidly drive devices Q26 and Q27 to a voltage boosted on condition. This capacitor physically is preferably merely an enhancement of the normally incurring capacitance between the gate and second region of device Q26 formed by the intentional overlap of the gate with that region. Capacitor CAP1 provides a similar bootstrap type of drive whenever the address input is in the opposite state. This occurs when the address applied to the gate of device Q40 is in the low state at time T1. In this event line 34 is charged to approximately VSX' a voltage generally representing the high state. This turns off device Q32 so that even though device Q31 is then turned on, lines 32 will remain precharged to the low state. On the other hand, lines 30 coupled to line 34 for devices Q30 and Q33 will go to the high state. Thus it may be seen that devices Q25 through Q28 are now in the inverse state as compared to that first described, and the states of the address signals and the inverse thereof appearing on lines 40 and 42 will be the inverse of those previously described in response to the address signal applied on line 38 to the gate of device Q40, the output signals A and $\overline{A}$ are thus both in the high state prior to line T2 and become valid at time T2 (with some very slight delay).

The signal representing an address bit applied on line 38 may be in either of two states. To interface with the commonly used support circuitry, these signals or states should be of the conventional TTL logic levels. Since the on-off transition voltage on line 38 may be maintained at the desired TTL logic transition by the voltage source circuit of FIG. 6. Accordingly, the impedances of devices Q6 and Q7 in the circuit of FIG. 6 (or more accurately the ratio of those impedances as the absolute value is not critical) are selected so that the voltage on line 20 is approximately equal to the desired transition voltage between logic levels for the TTL input. Thus, as previously described, the VSX' voltage on line 22 of FIG. 6 is higher than the voltage on line 20 by an amount equal to the threshold voltage of device Q8. Similarly, the voltage for the TTL input on line 38 for the transition between the on and off states for devices Q40 is lower than the voltage VSX' on the second region of those devices by an amount equal to the threshold voltage of devices Q40. Thus, it may be seen that if the threshold of device Q40 is substantially equal to the threshold of device Q8, the gate voltage for devices Q40 on line 38 for transition between the high and low logic levels on the TTL input will be equal to the voltage on line 20 of the voltage source, independent of the particular value of the threshold voltage for devices Q8 and Q40. Accordingly, since the threshold voltage is strongly dependent on processing, significant batch to batch variations in threshold voltage may be tolerated, and relatively high threshold voltage fabrication processes may be used without causing problems in achieving the TTL logic levels for the inputs to the buffer circuits. Thus in summary, the threshold of device Q8 automatically compensates for the threshold of device Q40, regardless of the reasonable batch to batch variation in these threshold voltages, since the threshold of devices Q8 and Q40 in each integrated circuit will closely match each other.

In accordance with the foregoing, it may be seen that each TTL buffer circuit is adapted to receive a TTL logic level address signal bit and to provide, as clocked outputs, a first signal representing the addressed bit and a second signal representing the inverse thereof. Thus, as may be seen in FIG. 1, five Y address TTL buffers 50 are used to receive the address input signals A0 through A4 respectively, and six X address TTL buffers are used to receive the address signals A5 through A10 respectively. Each of these buffers in the preferred embodiment is the buffer of FIG. 5. (One additional TTL buffer is used to buffer a TTL logic level chip select signal CS and to provide, as outputs, a buffered chip select signal CS and the inverse ($\overline{CS}$) thereof).

The outputs of the address buffers are applied to the 64 X decoders 54 and to the thirty-two Y decoders 56. The circuit for these decoders is shown in FIGS. 3 and 4 respectively.

Figure 8:
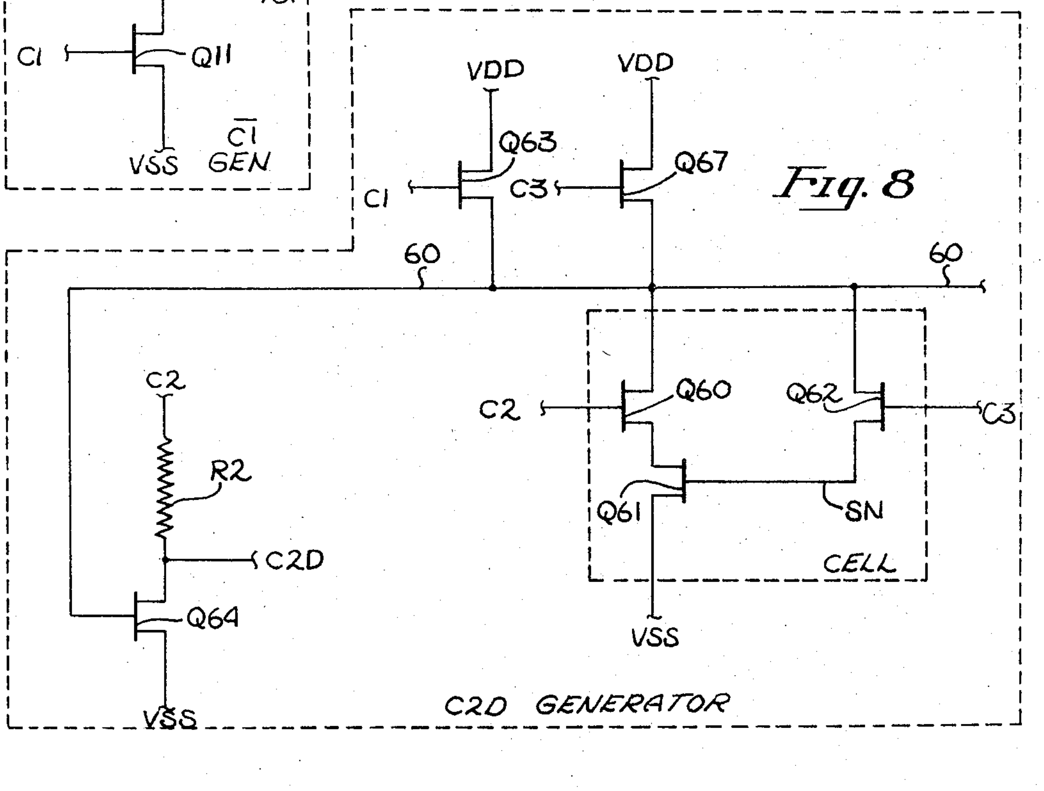
FIG. 8 is a circuit diagram for the C2D (the delayed second clock signal generator) generator.

Now referring to FIG. 8, an internal timing circuit shall now be described. The purpose of the circuit is to provide a clock signal C20 delayed with respect to the second clock signal C2. This clock signal is to provide a delay time within which the addressed cell may be read and the state of the cell coupled to the respective D/S prior to strobing that state to the memory output. Accordingly, one additional cell comprised of devices Q60, Q61 and Q62 is provided, with these devices connected and operating in the same manner as devices Q1, Q2 and Q3 of the basic memory and date control cell of FIG. 2. However, undecoded clock signals C2 and C3 are used to drive this cell instead of the decoded clock signals C2' and C3' for the memory cells and the data control cells. Thus, the cell shown in FIG. 8 is operative on each series of clock signals. Upon the occurrence of the first clock signal C1 at time TO, device Q63 is turned on, thereby precharging line 60 to the negative power supply voltage. At this time the second clock signal C2 is in the high state (e.g. at VSS) so that the delayed clock signal C2D is in the high state regardless of the condition of device Q64 because of the presence of resistor R2. At time T1 the clock signal C1 returns to the high state, though line 60 remains precharged to the low state. At time T2 the second clock signal C2 goes to the low state. Line 60 will temporarily remain in the low state, thereby maintaining Q64 on and holding the delayed clock signal C2D in the high state in opposition to resistor R2. The normal charge condition for the storage node SN is the low state thereby generally maintaining device Q61 on. Accordingly, the second clock signal C2 at time T2 turns on device Q60, thereby connecting line 60 to VSS, the positive power supply voltage. Line 60 is generally provided with a capacitance on the order of the capacitance of the various data sense lines, specifically the center portion and either the left or right portions of the D/S line, e.g., the center portion will not be simultaneously coupled to both sides as devices Q65 and Q66 are not simultaneously turned on. Accordingly, at some time after time T2 at least equal to the time required for the data sense line as well as the data control line to reach a data valid state, line 60 will go to the high state, thereby turning on device Q64 and allowing the delayed signal C2D to go to the low state of the second clock signal C2. This time shall be referred to as time T3 as shown in FIG. 13. At time T4 the second clock signal returns to the high state. This turns off device Q60 and also causes the delayed signal C2D to return to the high state.

The cell in FIG. 8, like the other cells in the memory, must be refreshed, though it will be refreshed without special addressing merely upon the occurrence of the third clock signal C3. Thus, during the refresh or read/-write operation (or a read operation in which the clock signal C3 occurs). The third clock signal C3 will go to the low state at time T5. This turns on devices Q62 and Q67, thereby coupling the storage node SN to the negative power supply terminal VDD refreshing the cell. At time T5 the third clock signal C3 returns to the high state with the circuit then being ready for another memory cycle (in the preferred embodiment approximately 20 nanoseconds should be allowed between the end of the third clock signal and the start of the first clock signal on the next memory cycle to allow a settling time for the various circuits).

Figure 9:
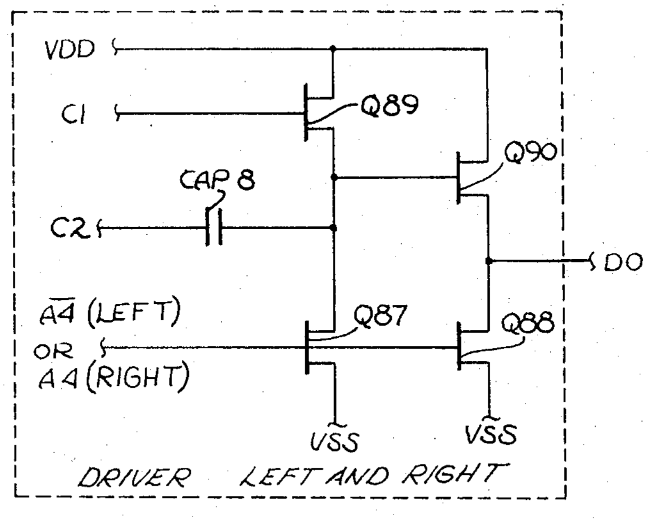
FIG. 9 is a circuit diagram for the left and right drivers.

Many aspects of these two decoders are functionally the same, and accordingly as to these aspects, common designations for the devices performing common functions will be used so that the explanation specifically with respect to the X decoder of FIG. 3 is also applicable to the Y decoder of FIG. 4 without the necessity of repetition in explanation. It will be noted from FIG. 1 that the function of the Y decoders is to decode the Y address signal, and in accordance with the decoding thereof couple the clock signals C2 and C3 to the cells in a respective column as the decoded clock signals C2' and C3' (only one column in the left 16 or one column in the right 16 columns may be addressed at any one time (e.g. only one in 32 is addressed at a particular time). Accordingly, the left (and the inverse thereof) driver 70 or right driver 72 is also initiated from the address bit determining the left-right sections thereby coupling either a left or a right data sense line to the center data sense line coupled to the X decoders by turning on either devices Q65 or Q66 of FIG. 1. (The driver circuit for the left and right drivers is shown in FIG. 9 and will be subsequently described herein).

At time TO, first clock signal C1 goes to the low state, thereby turning on devices Q70 and precharging lines 80 to the low state voltage VDD. At time T1, the first clock signal C1 returns to the high state and as previously described, each TTL address buffer has as its output one of the address bits and the inverse of that bit. These signals are applied to the gates of devices Q71 in various unique combinations so that no two X decoders receive the same address information. By way of example, the first X decoder as shown in FIG. 3 may have the gates of the six devices Q71 coupled to the six inverse address outputs of the respective six TTL buffers, that is, $\overline{A5A6A7A8A9A10}$. Thus whenever (and only when) the six bit X address is 000000, the input to the gates of device Q71 will all remain in the high state, thereby allowing line 80 to remain precharged to the low state. For any other address signal, at least one of devices Q71 will be turned on, thereby changing the state of line 80 to the high state. The second X decoder may be coupled to $\overline{A5A6A7A8A9}A10$. Accordingly, only when the six bit address is 000001 will the second decoder allow its respective line 80 to remain precharged in the low state after time T1. Accordingly, there are 64 unique combinations for the input to the devices Q71 in FIG. 3 so that line 80 in only one of the 64 X decoders will remain precharged to the low state after time T1, the specific decoder being determined by the six bit address signal. The operation of the Y decoder of FIG. 4 in this respect is identical, though only five devices Q71 are used to decode a five bit address signal to address one of the total 32 columns. (With one bit selecting between the left 16 and the right 16 as well as driving the left and right driver).

Now referring specifically to FIG. 3, line 80 for one of the 64 X decoders will remain precharged in the low state after time T1. Devices Q72 and Q73 are maintained in the on condition by devices Q74 and Q75, which are connected to form a voltage divider providing a voltage on the gates of devices Q72 and Q73 which is very close to the negative power supply voltage VDD. One voltage divider comprised of devices Q74 and Q75 is used as a common source for all 64 X decoders (and for the read/write generator of FIG. 12). In this regard devices Q72, Q73, Q74 and Q75 of the Y decoders of FIG. 4 perform a similar function.

For the one addressed X decoder and the one addressed Y decoder, the line 80 in each of these two address decoders will remain in the low state after time T2, and particularly after time T3, the beginning of the delayed second clock signal C2D. Accordingly, at time T3 the clock signal C2D changes to the low state and since device Q76 is held on in the one addressed X decoder, device Q77 in that decoder is turned on thereby. Accordingly, if the data sense line D/S for the respective row is in the low state, device Q78 will be on, thereby causing the read output line RO which previously has been precharged by C1 to be discharged to the positive power supply terminal. If, however, the corresponding data sense line D/S is in the high state, device Q78 will be off and the read output line RO will essentially remain precharged. Capacitor CAP3 which physically is comprised of an overlap between the gate and the corresponding region of device Q76, provides a dynamic feedback voltage to the gate of device Q76 in the addressed X decoder so that when the signal C2D goes to the low state, the coupling of capacitor CAP3 drives the gate of device Q76 to an even lower state, thereby assuring that device Q76 to an even lower state, thereby assuring that device Q76 in the addressed decoder is sharply and firmly driven to the full on condition. (Device Q79, turned on and off by the first clock signal C1, is to precharge the corresponding data sense line D/S to VDD in much the same manner as the left and right data sense lines).

Figure 10:
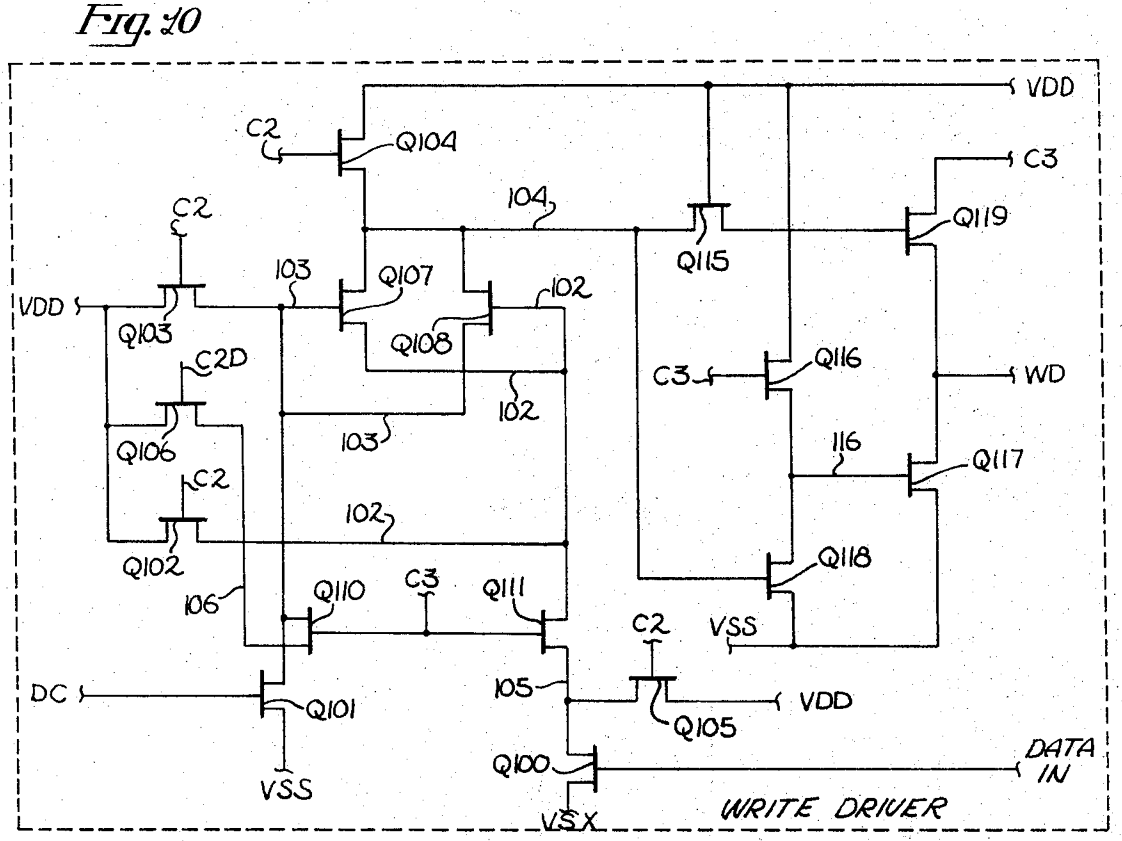
FIG. 10 is a circuit diagram for the write driver.

In the event a write command is to be executed, the desired state is applied to the X decoder on a write driver line WD from a write driver circuit shown in FIG. 10. The coupling of the write driver signal WD to the data sense line D/S is controlled by device Q80, which in turn is turned on by the addressed X decoder through device Q72 and Q82 controlled by the write command signal on line WC. Device Q81 is used to assure that the gate of Q80 remains discharged in the sixty-three unselected decoders. Thus, when the write command signal WC goes to the low state, device Q81 is turned on. For the addressed X decoder, device Q72 couples a low state to one region of device Q81 and to the gate of device Q82 so that both devices Q81 and Q82 are turned on and the low state of the WC signal is coupled to the gate of device Q80, thereby coupling the write driver signal in the addressed X decoder to the data sense line D/S. In the non-addressed decoders line 80 will be in the high state, thereby holding device Q82 off and coupling the high state of line 80 to the gate of device Q80 through device Q81 to decouple the write driver signal WD from the data sense line of the non-addressed X decoders (capacitors CAP4 are similar in function to capacitors CAP3 in that they feedback the change of voltage in the gate of device Q80 from high state to the low state to the gate of device Q82 to further drive that device on in the addressed X decoder).

The function of device Q83 and capacitor CAP5 is similar to the function of device Q76 and capacitor CAP3 in the X decoders. However, one region of device Q83 is coupled to the second clock signal C2 instead of C2D so that the decoded clock signal C2′ is provided by the addressed Y decoder. Similarly device Q84 and capacitor CAP6 are similar in function to device Q82 and capacitor CAP4, though one region of device Q84 is coupled to the third clock signal C3 so that the output of that device is the decoded clock signal C3′.

Now referring again to FIG. 1, it may be seen that the complete Y decoding includes the decoding of the thirty-two Y decoders. However, coupling of the addressed column to the center data sense line D/S must be accomplished by the turning on either of devices Q65 by the left driver 70 to couple the left data sense line to the center data sense line, or the turning on of devices Q66 by the right driver 72 to couple the right data sense line to the central data sense lines. Thus, actuation of the left or right driver 70 or 72 must occur with the operation of the Y decoders. Both drivers utilize identical circuits, though the basic input to the gates of the devices Q87 and Q88 for the left driver is the inverse of the address bit A4 ($\overline{A4}$) whereas the input for the right driver is the address bit itself (both as buffered). Thus, it may be seen that the inputs to the drivers are mutually exclusive, and accordingly the driver outputs on lines DO are accordingly mutually exclusive (that is the driver output DO-L for the left driver is necessarily the inverse of the driver output DO-R for the right driver. At time TO the first clock signal C1 goes to the low state, thereby turning on device Q89 and charging the gate of device Q90 to the low state voltage. At time T1 device Q89 is turned off so the gate of device Q90 will remain in the low state unless thereafter driven to the high state. At time T2 the second clock signal C2 changes from a high state to the low state, thereby driving the gate of device Q90 to an even lower state through the capacitor CAP8. However, one of the two drivers signals A4 or $\overline{A4}$ received from the corresponding TTL buffer will go to the low state at time T1 or shortly thereafter, turning on both devices Q87 and Q88, and thereby turning off device Q90 by driving its gate to the high state VSS, and at the same time driving the driver output DO to the high state through device Q88. For the other driver the gates of devices Q87 and Q88 will be maintained in the high state, thereby allowing the driver output DO to remain in the low state. Thus, it may be seen that the outputs as well as the inputs are mutually exclusive after time T1 (or at least a short time thereafter).

It may be seen from the foregoing explanation of the operation of the X decoders that whenever the write command signal WC is in the low state, device Q80 is on so that a write driver signal WD may be applied from a write driver circuit to force the state of the data sense line D/S. The write command signal WC is provided by the read-write generator of FIG. 12. It may be seen that the coupling of the clock signal C3 to the write command signal WC is controlled by device Q91 which must be on if the write command signal WC is to go to the low state at time T5. At time TO to the first clock signal C1 goes to the low state thereby turning on device Q92. This charges line 84 to the low state voltage. If the particular chip is selected, the chip select signal CS on the gate of device Q93 will be in the high state, and will remain in the high state. The memory circuits herein being described are generally nonresponsive to the state of the chip select signal, except during the time interval TO to T2. Thus, if the chip is selected, the chip the chip select signal CS which is generated by a TTL buffer on the gate of device Q93 will be in the high state at the time T1, thereby allowing line 84 to remain charged to the low state voltage VDD (provided the read/write signal on the gate of device Q95 is in the high state, indicating an external write command). Device Q94 is maintained in the on condition by the connection of its gate to the voltage V′ (FIG. 3) provided by the single voltage divider comprising devices Q74 and Q75 for supplying the read/-write generator and the 64 X decoders. Accordingly, the low state voltage on line 84 is coupled to the gate of device Q91, turning on that device and allowing the direct coupling of the third clock signal C3 to the right command output WC. (Capacitor CAP9 provides a dynamic voltage feedback when the write command signal WC changes from the high state to the low state at time T5 so as to drive the gate of device Q91 into an even lower state).

If, however, the chip is not selected so that the chip select signal CS is in the low state in an interval approximately between TO and T2, line 84 will be forced into the high state VSS by device Q93, and accordingly, this high state will be coupled to the gate of device Q91 to decouple the third clock signal C3 from the write command output WC. Similarly, if a read instruction is received instead of a write instruction, the gate of device Q95 will be in the low state, thereby also forcing line 84 and the gate of device Q91 into the high state so as to decouple the write command from the third clock signal. In order to provide the TTL logic levels as herein before described, one region of device Q95 is coupled to the voltage source VSX' of the voltage source circuit of FIG. 6. Thus, it may be seen that the TTL compatability for the read/write input R/W is provided in this circuit, and the write command signals WC will be provided to the X decoders only if a write command is provided and simultaneously a chip select signal is received.

Figures 11, 12:
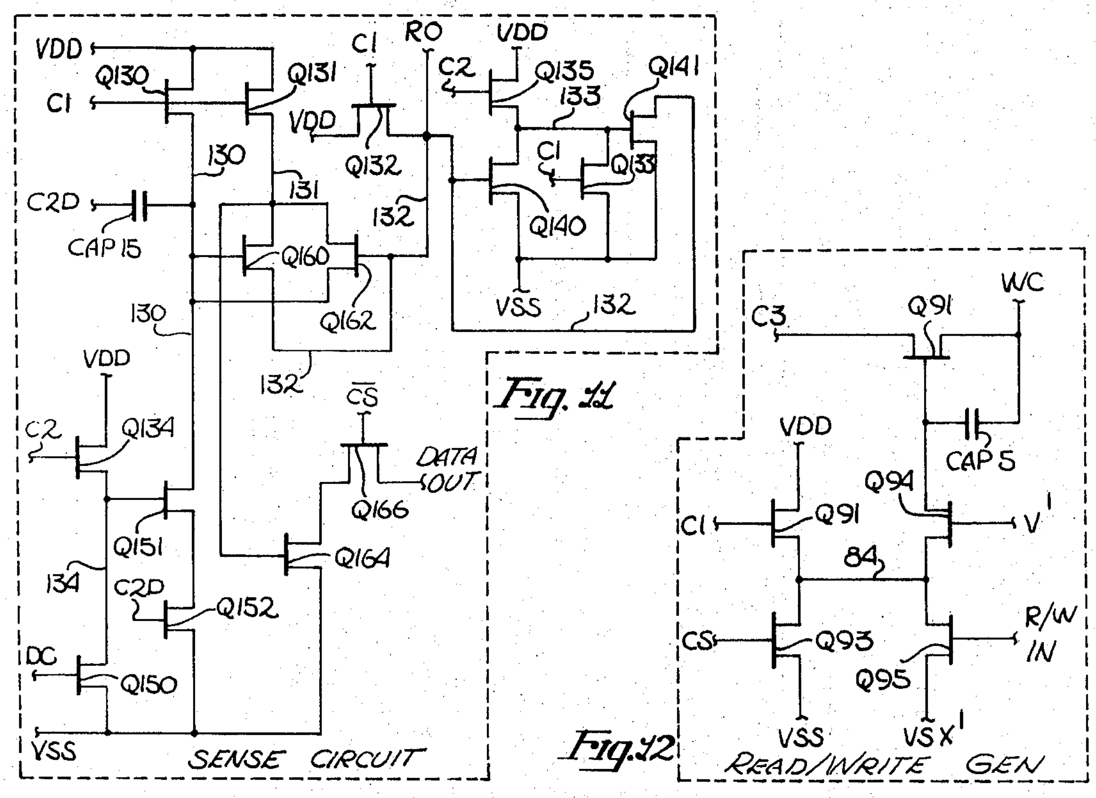
FIG. 11 is a circuit diagram for the sense circuit.
FIG. 12 is a circuit diagram for the read/write generator, all the foregoing circuits being the preferred circuits for use in the present invention.

In the previous description of the operation of the X decoders of FIG. 3, it was noted that upon the occurrence of a write command signal WC applied to the X decoders by the read/write generator of FIG. 12, the state of the write driver signal WD will be impressed on the data sense line D/S through device Q80 of the addressed X decoder. It is to be noted that the write command signal WC from the read/write generator for a write command is essentially the third clock signal C3 (e.g., a write command enabled the C3 signal to be applied as the write command WC to the X decoders). It will be noted also that in the basic cell of FIG. 2, devices Q3 in each cell of the addressed column will be turned on by the decoded clock signal C3'. Accordingly, the storage note SN of the single cell falling within both the addressed row and the addressed column will be forced to the state of the data sense line D/S of the addressed row, which in turn will be forced to the state of the write driver, that is, the signal WD. Thus in place of the previous data of the storage node the output of the write driver is written into the addressed cell. Upon the occurrence of a write command and the third clock signal.

The write driver circuit may be seen in FIG. 10. Before explaining the operation of the circuit in detail, however, it should be noted that since the state of every cell in a column, including the data control cell in that column is inverted upon each occurrence of a decoded third clock signal C3' in that column. Thus the desired state to be written into an addressed cell will vary depending upon the state of the date control cell in that column. Accordingly, the basic data input, that is, the data bit applied to one region of device Q100, cannot be coupled directly to the write driver output WD, but instead an exclusive OR logic function must be performed on the data in and the data control signal on the data control signal on the data controls line DC (as determined by the data control cell in the addressed column).

Thus the date control signal DC is also provided as an input to the write driver circuit on the gate of device Q101, whereas the data input is provided to the gate of device Q100, with one region of that device being coupled to the voltage source VSX of FIG. 6 to provide the TTL compatability as hereinbefore described in detail. At time T2 the second clock signal goes to the low state, thereby turning on devices Q102, Q103, Q104 and Q105, charging lines 102, 103, 104 and 105 to the low state voltage VDD. At time T3 the delayed second clock signal C2D also goes to the low state, thereby turning on device Q106 and charging line 106 to the low state if DC is at VSS. If, however, DC is at a negative level line 106 will remain near VSS. Accordingly, both regions of devices Q107 and Q108 are precharged to the low state, as are the gates thereof. Shortly after time T2 the data control signal DC becomes valid (e.g., settles to the state of the addressed data control cell). If the data control signal DC is in the low state, device Q101 will be turned on, and since device Q101 is a much lower impedance device than device Q106 (e.g. the on impedance of device Q101 in the preferred embodiment is approximately one-thirty of the on impedance of device Q106), the state of line 106 will be forced to the high state voltage VSS by device Q101. If, however, the data control signal DC is in the high state, device Q101 will remain off and device Q106 will result in line 106 being charged to VDD, the low state voltage. Thus, just before the third clock signal C3 at time T5, the state of line 106 is the inverse of the state of data control signal DC, and the state of line 105 is the inverse of the data input signal on the gate of device Q100.

At time T5 the third clock signal C3 goes to the low state. This turns on devices Q110 and Q111, coupling the state of lines 105 and 106 to lines 102 and 103 respectively. If the data input signal and the data control signal are both in the high state, lines 102 and 103 will accordingly remain in the low state. Neither Q107 or Q108 will be turned on. Thus line 104, which was present to the low state by the second clock signal through device Q104, will remain in the low state. If the data input signal and the data control signal were both in the low state, both lines 102 and 103 will go to the high state, thereby turning off devices Q107 and Q108 before any significant conduction occurs therein by the change in voltage on the regions coupled to lines 102 and 103, so that line 104 will again remain in the low state. However, if the data input signal and the data control signal are in opposite states, one of the lines 102 and 103 will be in the high state and the other will be in the low state. The one of devices Q107 and Q108 having its gate in the low state will be turned on, because the source of that device will be coupled to the high state. Consequently, the one of devices Q107 and Q108 which is turned on when the data input control signals are in opposite logic states will result in the change in date line 104 to the high state. Accordingly, devices Q107 and Q108 are the two key devices performing the exclusive OR function and providing the result of the exclusive OR operation on line 104. Device Q115 is maintained in the on condition by the connection of its gate to the negative power supply voltage VDD. Thus, on the occurrence of the third clock signal C3 at time T5, device Q116 will be turned on. If line 104 is in the low state, device Q118 will also be turned on and this device, having a lower impedance than device Q116, will determine the state on line 116. If line 104 was in the low state, device Q118 will be on and line 116 will be forced toward the high state voltage VSS. If line 104 is in the high State device Q116 will force line 116 to the low state. Upon the occurrence of the third clock signal C3 at time T5, if line 104 is in the low state device Q119 will be on and device Q117 will be off, forcing the write driver signal to follow the third clock signal C3 in wave form. However, if line 104 was in the high state upon occurrence of the third clock signal, device Q119 and device Q118 will be off, device Q116 will be on, line 116 will be forced to the low state and device Q117 will be on, forcing the write driver signal WD toward VSS, the high state voltage. Thus, in summary, if the data input and the data control signals are in the same state, the write driver signal WD will follow the third clock signal in wave form, but if the data input and data control signals are in the opposite state, then the write driver signal WD will be forced into the high state during the latter part of the third clock signal.

Now referring to FIG. 11, the final individual circuit used in the memory of the present invention may be seen. This circuit is the data sense circuit of FIG. 1 which receives as inputs the signal on the read output line RO coupled to the X decoders, and the data control signal DC to provide a single data output signal on the output thereof. As in the write driver, the sense circuit performs an exclusive OR function providing an output in the high state when the read output line and the data control line are in the same state, and an uncoupled output if these two signals are in opposite state. Accordingly at time TO, the first clock signal C1 goes to the low state turning on devices Q130, Q131, Q132 and Q133. This forces lines 130, 131 and 132 to the low state and line 133 to the high state. At time T1 the first clock signal C1 returns to the high state and at time T2 the second clock signal C2 goes to the low state, thereby turning on devices Q134 and Q135. However, at time T2 the data control line will be in the low state, having been pre-set to the low state by device Q5 and the first clock signal (see FIG. 1). Thus since device Q150 is a much lower impedance than device Q134, initially at time T2 line 134 is forced towards the high state (VSS) initially maintaining device Q151 in the off condition (device Q152 is also off at time T2 so that line 130 may remain preset to the low state voltage.

Similarly, the read output line RO will initially be in the low state at time T2 as a result of the pre-setting of the state of that line through device Q132 and the time required for the circuits to respond to the state of the addressed cell and change the state of the read output line so required. Since the read output line is in the low state initially at time T2, device Q140 is on, and since that device is a lower impedance device than device Q135, line 133 will be in a sufficiently high state to maintain device Q141 in the off condition.

At time T3 the second delayed clock signal C2D will strobe the state of the data sense line onto the read output line RO. By this time the data control signal DC applied to the gate of device Q150 will reflect the state of the data control cell in the respective addressed column, which signal will determine the state applied to the gate of device Q151. Accordingly, at time T3 when the second clock signal C2D goes to the low state device Q152 will be turned on. If device Q151 is off at this time line 130 will remain set at the low state. If, however, device Q151 is on line 130 will be driven towards the high state voltage VSS. Thus it may be seen that line 130 will remain substantially at the low state up to time T3 and thereafter will either remain in the low state or will progress toward the high state, depending upon the state of the data control signal DC.

Also at the time T3, the read output line RO is enabled by the addressed X decoder as previously mentioned. The two states for the read output line are either the pre-set low state or a drive into or toward the high state. If the addressed cell results in a read output line remaining at the low state, then of course lines 132 will also remain in the low state. If, however, the addressed memory cell results in the driving of the read output line toward the high state, then after an initial change in the voltage of the read output line device Q140 will be turned off. Accordingly, device Q135 will drive line 113 to the low state, turning on device Q141, thereby coupling the read output line through device Q141 to the high state voltage VSS, providing greater drive for the voltage change of the read output line RO toward the high state. Thus it may be seen that devices Q133, Q135, Q140 and Q141 operate as a trigger circuit to sense a change in the read output line toward the high state and provide further drive for that change. This circuit substantially enhances the speed of the sense circuit since the read output line RO is coupled to all sixty-four rows and consequently has significant capacitance associated therewith. In this regard it should be noted that the drive for the read output line as provided by each X decoders is comprised of two devices in series so that a total of 128 devices are provided in the 64 X decoders, any two of which may be called upon to drive the read output line. Accordingly, 128 low impedance devices would have to be provided to assure a consistently rapid drive for the read output line, whereas the circuit herein before described allows most of the drive of the read output line to be provided by a single low impedance device Q141.

Thus it may be seen that at time T3, either both or neither lines 130 and 132 may go from the low state to the high state. Devices Q160 and Q162 are connected to lines 130, 131 and 132 in the same manner as devices Q107 and Q108 are connected to lines 103, 104 and 102, respectively in the write driver circuits, and again are connected in this manner to provide the desired exclusive OR function between the data control signal and the read output line signal. Accordingly, if both lines 130 and 132 remain low after time T3, then the gate and the two regions of both devices Q160 and Q162 remain in the low state, thereby maintaining the gate of device Q164 in the low state. If a chip select signal has been received both devices Q164 and Q166 will be on and the output will be coupled to the high state voltage VSS. Similarly if both the read output line and the data control signal drive lines 130 and 132 to the high state, then the high state voltage on the gate of devices Q160 and Q162 will maintain these devices in the off condition, thereby also allowing line 131 to remain in the low state and also resulting in a high state output of the sense circuit (e.g. data output signal). If, however, only one of lines 130 and 132 go to the high state, then the gate of one of devices Q160 and Q162 will remain in the low state with one region of that same device driven to the high state, thereby turning on that device and changing the state of line 131 to the high state. This turns off device Q164 so that the inverse of the chip select signal $\overline{CS}$ does not result in the coupling of the data output line to VSS. Thus it may be seen that the two output states for the memory of the present invention are a first state capable of delivering an output current or voltage driven by the positive power supply terminal VSS (neglecting the threshold voltage of the devices), and a second state not capable of delivering such an output current.

It may be seen from the foregoing description that if lines 130 and 132 both change to the high state at time T3 neither devices Q160 or Q162 should conduct, so that the low state of line 131 is not disturbed. This will be true if the change in voltage of lines 130 and 132 from the low state to the high state track to within the threshold level of devices Q160 and Q162. It has been found that line 130 has a tendency to change state faster than line 132 so that momentary conduction of device Q162 may occur. To prevent this, the delayed second clock signal C2D is coupled through capacitor CAP15 to line 130. This provides an initial dip in the voltage of line 130 at time T3 so that line 130 will not overtake line 132 by more than the threshold of the devices during the shift in state of both lines 130 and 132 to the high state.

Having now described each of the individual circuits of the present invention and the inter-relation between individual circuits to provide buffering with TTL compatability, addressing, reading and writing operations, etc. a complete memory cycle with respect to the timing diagrams of FIG. 13 will now be described. The three clock signals C1, C2 and C3 (FIGS. 13a through 13c respectively) are the externally applied clock signals. (These clock signals are shown as less than perfectly square signals as a recognition of the fact that at speeds typical in the memory of the present invention, relatively perfect square waves are substantially impossible to achieve). At time TO, as shown in the figures, the memory cycle is initiated by the first clock signal C1 going to the low state. This precharges all data sense lines and various other internal nodes in the circuit. Also, the TTL buffer output, that is A and $\overline{A}$, are held VSS. The address inputs and the chip select signal for the TTL buffer inputs must be valid e.g. in the proper states in the preferred embodiment approximately 50 nanoseconds before time T1. Thus at time T1 when the first clock signal T1 goes to VSS ending the precharging or presetting operation, the TTL buffers strobe and latch the address inputs, and one output of each buffer (A or $\overline{A}$) starts toward VDD. These signals of course are applied to the decoders so that decoding is completed sometime after time T1. Thus by time T2 when the second clock signal goes to the low state, the TTL address inputs need no longer be valid, and the decoders have settled based on the address inputs. Thus the decoding function is complete and either the right or the left driver at VDD.

At time T2 a reading operation, begins, and between time T2 and T3 a decoded clock signal C2′ is applied to the cells. The cells transfer the inverse of their storage node states to the data sense line D/S. At the same time precharging is taking place in the write driver. At time T3 the delayed second clock signal C2D goes to the low state and the data sense line information of the selected cell is strobed by the C2D signal onto the read output line RO. At the same time the sense circuit responds to the state of the data control cell in the addressed column, and the sense circuit starts generating the output logic function between the data control and the read outputs signals. By time T4 the read operation is complete and the second clock signal C2 and the delayed second clock signal C2D return to the high state.

If only a read operation is to be executed this may represent the end of the memory cycle and a subsequent cycle may be started shortly after T4. As an alternative, the third clock signal may be applied without disturbing the memory providing the read/write input signal commands a read operation. If a write operation is to be executed the third clock signal must be applied and a write signal applied to the circuit. Thus, approximately fifteen nanoseconds before time T5, in the preferred embodiment, the TTL data input and the read/-write control signal must be valid, e.g., data valid and the read write control signal commanding a write operation. At time T5 the third clock signal goes to the low state and the write command signal WC is generated if the read/write input signal is in the high state. The third clock signal latches the data input, and an exclusive OR function between the data input and the data control signal is performed in the write driver to provide the write driver signal. The third clock signal is decoded as the signal C3′, which goes to the low state turning on the device Q3 in all cells in the selected column. The write driver signal is transmitted by the selected X decoder to the data sense line and to the storage node of the cell common to the addressed row and the addressed column (if a write operation is not taking place the storage node merely assumes the level of the data sense line without the drive of the write driver). Finally, at time T6 the third clock signal returns to the high state. The data input and the read/write signals need no longer be valid. This completes the full memory cycle and after a short settling time, a new memory cycle may be initiated.

There has been described herein the organization and individual circuits for a 2,048 bit random access memory which may be fabricated in integrated circuit form with MOS devices to provide an extremely fast random access memory. The circuit is adapted to respond to three clock signals, which in the preferred embodiment are externally applied signals, to address the memory and perform a read or a write operation. Refreshing is accomplished by periodically addressing each and every row in the memory. Since a chip select signal is not required for refreshing, a memory bank comprised of many memories of the present invention may be refreshed simultaneously. The circuit contains many unique features such as the special trigger circuit to shorten the time required to execute a read operation, and the voltage source circuit which allows the fabrication of the memory in integrated circuit form using relatively high threshold MOS devices while maintinaing TTL comparability on the desired inputs. The memory also includes many other features which will be obvious to those skilled in the art. By way of example referring again to the decoder circuits of FIGS. 3 and 4, it was heretofore pointed out that one voltage divider comprised of devices Q74 and Q75 was used for all 64 X decoders and one such voltage divider was used for all 32 Y decorders. This has substantial advantages over the use of a voltage divider for each decoder or even the elimination of devices Q72 and Q73 in the decoders. In particular, at time TO when the first clock signal goes to the low state, all of lines 80 are pre-set to the low state. The region of devices Q72 and Q73 coupled to line 80 has some capacitance with respect to the gates of the same two devices so that the change of line 80 to the low state is in part coupled to the voltage V′ to depress that voltage below its normal value, and typically even below the voltage VDD by an amount at least equal to the offset voltage of the devices. In this regard it should be noted that device Q74 has a high impedance and is the only device encouraging V′ back to its normal voltage, since device Q75 will be turned off by the depression of the voltage V′. Accordingly, when V′ is depressed as stated, devices Q72 and Q73 are firmly turned on so that the state of line 80 may be directly coupled to the gates of devices Q82 and Q76 (e.g., the depression of V′ overcomes the threshold voltage of devices Q72 and Q73). Later in the memory cycle as decoding occurs line 80 in each of the X decoders except one and in each of the Y decoders except one is forced to the high state. This drives V′ back to its normal level. However, device Q75, which is now on as is device 74, has a low impedance (approximately one one-hundredths of the impedance of device Q74) so as to resist the encouragement of the voltage V′ above VDD plus the threshold of device Q75 and a further voltage increment dependent upon the ratio of impedances of the two devices. This voltage on V′, however, is sufficiently high to be above the threshold of devices Q72 and Q73, thereby maintaining these devices in the off condition. Consequently, upon the occurrence of a write command signal WC or the delayed second clock signal C2D, the capacitances CAP4 or CAP3, respectively, result in the feedback of the change in state of the respective regions of these two devices to the gates thereof, thereby forcing the gate below the preset voltage VDD so as to overcome the threshold level of these devices. Thus devices Q76 and Q82 may be turned full on by the respective signals, not withstanding the threshold of devices. Accordingly, it may be seen that the net result of the voltage V′ is improved coupling in a first area of the circuit when desired and later a substantial decoupling at the same location so as to allow increased drive in a second portion of the circuit.

Thus, in accordance with the foregoing it may be seen that a new and unique memory circuit has been described and further, that certain new and unique individual circuits applicable to the preferred embodiment memory described herein as well as other circuits has also been described. While the invention has been particularly shown and described with reference to a preferred embodiment thereof, it will be understood by those skilled in the art that various changes in form and details may be made therein without departing from the spirit and scope of the invention.

We claim:

1. In an MOS semiconductor memory, a plurality of memory cell means arranged in rows and columns, each said memory cell means having a dynamic storage node and being a means coupled to a data sense line for that row and responsive to a decoded first clock signal for that column to set said data sense line to a logic state opposite the logic state of its said storage node, and responsive to a decoded second clock signal for that column for setting the state of said data sense line into said storage node;

a plurality of data control cell means, each said data control cell means being in one of said columns, each said data control cell means having a dynamic storage node and being a means coupled to a data control line and being responsive to a decoded first clock signal for that column to set a data sense line to a logic state opposite the logic state of its said storage node, and responsive to a decoded second clock signal for that column for setting the state of said data sense line into said storage node;

a plurality of TTL buffer means, each said TTL buffer means being a means for receiving a plurality of TTL address logic signals and presenting, as outputs thereof, the equivalent MOS compatible logic signals and the inverse thereof;

a plurality of X decoder means, each said X decoder means being associated with a row of said memory cell means and being a means for receiving a unique combination of outputs from a first group of said TTL buffer means and for coupling said data sense line for that row to a read output line following the occurrence of a specific and unique combination of inputs to said first group of TTL buffer means;

a plurality of Y decoder means, each said Y decoder means being associated with a column of said memory cell means and said data control cell in said column, and being a means for receiving a unique combination of outputs from a second group of said TTL buffer means and for coupling said first clock signal and said second clock signal, as said decoded first clock signal and said decoded second clock signal, to all said cells in the respective column following the occurrence of a specific and unique combination of inputs to said second combination of TTL buffer means; and sensing means for sensing the states of said read output line and said data control line and for providing a logic data output signal which is a first logic state signal when said read output line and said data control line is in the same state, and is a second logic state when said read output line and said data control line are in opposite states.

2. The memory of claim 1 further comprised of a read/write generator means and a write driver means, said read/write generator being coupled to said plurality of X decoder means and being a means for receiving a TTL read/write logic signal and for providing a write command signal to said X decoder means upon the occurrence of said TTL write logic signal, said write driver means being a means for receiving a TTL data input logic signal and a signal from said data control line and for providing a write driver signal to said plurality of X decoder means, upon the occurrence of a timing signal, having one logic state when said TTL data input logic signal and said data control line are at the same state, and another logic state when said TTL data input logic signal and said data control line are in opposite states, each said X decoder means further being a means for coupling said write driver signal to said data sense line upon the occurrence of said write command signal following said occurrence of a specific and unique combination of inputs to said frist combination of TTL buffer means.

3. The memory of claim 1 further comprised of a voltage source means, said voltage source means being a means for providing an output voltage different from a predetermined voltage between the first and second voltages characteristic of TTL logic states by an amount substantially equal to the threshold voltage of the MOS devices of said semiconductor memory, at least one of said means receiving a TTL input signal having, as an input device, a first MOS device having a first and second region and an insulated gate, said first region being coupled to said output voltage of said voltage source means and said gate of said first MOS device being coupled to said TTL input signal, whereby the said voltage of said voltage source may compensate for threshold voltage variations in said MOS device to maintain the TTL compatibility of the circuit receiving said TTL input signal.

4. The memory of claim 3 wherein said voltage source is comprised of a second MOS device having first and second regions and an insulated gate, said second MOS device having its said first region coupled to a first power supply terminal, its said second region providing said output voltage of said voltage source and being coupled to said second power supply terminal through said load device, and its said gate coupled to a predetermined voltage.

5. The memory of claim 4 further comprised of a third MOS device and said load device is a fourth MOS device, each having first and second regions and an insulated gate, said first region of said second MOS device being coupled to said first power supply terminal through said third MOS device by being coupled to said second region of said third MOS device, said gate and said first region of said third MOS device being coupled to said first power supply terminal, said fourth MOS device having its said first region and its said gate coupled to said second region and said first region of said second MOS device respectively, and its said second region to a reference power supply voltage.

6. The memory of claim 4 further comprised of third and fourth MOS devices each having first and second regions and a gate, said first region of said third MOS device and said gates of said third and fourth MOS devices being coupled to a first power supply terminal, said second region of said third MOS device being coupled to said first region of said fourth MOS device and to said gate of said second MOS device to provide said predetermined voltage thereto, said second region of said fourth MOS device being coupled to said second power supply terminal.

7. The memory of claim 4 further comprised of a fifth MOS device and said load device is a sixth MOS device, each having first and second regions and an insulated gate, said first region of said second MOS device being coupled to said first power supply terminal through said fifth MOS device by being coupled to said second region of said fifth MOS device, said gate and said first region of said fifth MOS device being coupled to said first power supply terminal, said sixth MOS device having its said first region and its said gate coupled to said second region and said first region of said second MOS device respectively, and its said second region to a reference power supply voltage.

8. The memory of claim 1 wherein said sensing means is comprised of first and second MOS devices, each having first and second regions and an insulated gate, said first and second MOS devices having their first regions coupled together, said first MOS device having its second region coupled to said gate of said second MOS device, and said second MOS device having its said second region coupled to said gate of said first MOS device.

9. The memory of claim 8 further comprised of a coupling means, and means for simultaneously applying a first signal to said gate of said first MOS device responsive to the state of the one of said data control cells in an addressed column, and a second signal to said gate of said second MOS device responsive to the state of the one of said memory cells in an addressed column and an addressed row.

10. The memory of claim 1 further comprised of trigger means coupled to said read output line, said trigger means being a means for the sensing of the change of state of said read output line from a first state toward a second state and to provide a drive voltage to said read output line upon said sensing of the change to drive said read output line toward said second state.

11. The memory of claim 2 wherein said write driver means is comprised of first and second MOS devices, each having first and second regions and an insulated gate, said first and second MOS devices having their first regions coupled together, said first MOS device having its second region coupled to said gate of said second MOS device, and said second MOS device having its said second region coupled to said gate of said first MOS device.

12. The memory of claim 11 further comprised of a coupling means, and means for simultaneously applying a first signal to said gate of said first MOS device responsive to the state of the one of said data control cells in an addressed column, and a second signal to said gate of said second MOS device responsive to the state of said TTL data input logic signal.

13. The memory of claim 1 further comprised of a delay means and coupling means, and wherein said X decoder means is a means for receiving a unique combination of outputs from a first group of said TTL buffer means and for coupling said data sense line for that row to a read output line following the occurrence of a specific and unique combination of inputs to said first group of TTL buffer means, and upon the occurrence of a delayed clock signal, the output of said delay means being coupled to said X decoder means through said coupling means, said delay means being an additional cell means having a dynamic storage node and being responsive to said first clock signal to set said output of said delay means to a logic state opposite the logic state of its said storage node, and responsive to said second clock signal for setting the state of its said output into said storage node.

14. In an MOS memory circuit wherein first and second logic signals must be compared and a third logic signal provided which has a first logic state when said first and second logic signals are in the same logic states, a means for providing said third logic signal comprising; an input means, a coupling means and first and second MOS devices, each having first and second regions and an insulated gate, said first and second MOS devices having their first regions coupled together, said first MOS device having its second region coupled to said gate of said second MOS device and said second MOS device having its said second region coupled to said gate of said first MOS device, said input means being coupled to the gates of said first and second MOS devices and being a means for substantially simultaneously coupling said first and second logic signals to said gates of said first and second MOS devices respectively, said coupling means being a means coupled to said first regions of said first and second MOS devices for providing said third logic signal.

15. A means for providing compatibility of an MOS logic circuit with a logic signal input to an integrated circuit independent of the reasonable variation of the threshold voltage of the MOS devices comprising a first MOS device having first and second regions and an insulated gate, a voltage source circuit means and an MOS logic circuit means, said first MOS device having its first region coupled to said MOS logic circuit means, its second region coupled to said voltage source means, and its gate coupled to said logic signal input, said MOS logic circuit means being a means for providing a logic signal output responsive to the conduction state of said first MOS device, said voltage source means being a means for providing a voltage different from a predetermined voltage between the voltages of said logic signal input, by an amount approximately equal to the threshold voltage of said first MOS device.

16. The memory of claim 15 wherein said voltage source is comprised of a second MOS device having first and second regions and an insulated gate, said second MOS device having its said first region coupled to a first power supply terminal, its said second region providing said output voltage of said voltage source and being coupled to a second power supply terminal through said load device, and its said gate coupled to a predetermined voltage.

17. The memory of claim 15 further comprised of a third MOS device and said load device is a fourth MOS device, each having first and second regions and an insulated gate, said first region of said second MOS device being coupled to said first power supply terminal through said third MOS device by being coupled to said second region of said third MOS device, said gate and said first region of said third MOS device being coupled to said first power supply terminal, said fourth MOS device having its said first region and its said gate coupled to said second region and said first region of said second MOS device respectively, and its said second region to a reference power supply voltage.

18. The memory of claim 15 further comprised of third and fourth MOS devices each having first and second regions and a gate, said first region of said third MOS device and said gates of said third and fourth MOS devices being coupled to a first power supply terminal, said second region of said third MOS device being coupled to said first region of said fourth MOS device and to said gate of said second MOS device to provide said predetermined voltage thereto, said second region of said fourth MOS device being coupled to said second power supply terminal.

19. The memory of claim 15 further comprised of a fifth MOS device and said load device is a sixth MOS device, each having first and second regions and an insulated gate, said first region of said second MOS device being coupled to said first power supply terminal through said fifth MOS device by being coupled to said second region of said fifth MOS device, said gate and said first region of said fifth MOS device being coupled to said first power supply terminal, said sixth MOS device having its said first region and its said gate coupled to said second region and said first region of said second MOS device respectively, and its said second region to a reference power supply voltage.

20. In an MOS semiconductor memory, a plurality of memory cell means arranged in rows and columns, each said memory cell means having a dynamic storage node and being a means coupled to a data sense line for that row and responsive to a decoded first clock signal for that column to set said data sense line to a logic state opposite the logic state of its said storage node, and responsive to a decoded second clock signal for that column for setting the state of said data sense line into said storage node;

a plurality of data control cell means, each said data control cell means being in one of said columns, each said data control cell means having a dynamic storage node and being a means coupled to a data control line and being responsive to a decoded first clock signal for that column to set a data sense line to a logic state opposite the logic state of its said storage node, and responsive to a decoded second clock signal for that column for setting the state of said data sense line into said storage node;

a plurality of buffer means, each said buffer means being a means for receiving a plurality of address logic signals and presenting, as outputs thereof, the equivalent MOS compatible logic signals and the inverse thereof;

a plurality of X decoder means, each said X decoder means being associated with a row of said memory cell means and being a means for receiving a unique combination of outputs from a first group of said buffer means and for coupling said data sense line for that row to a read output line following the occurrence of a specific and unique combination of inputs to said first group of buffer means;

a plurality of Y decoder means, each said Y decoder means being associated with a column of said memory cell means and said data control cell in said column, and being a means for receiving a unique combination of outputs from a second group of said buffer means and for coupling said first clock signal and said second clock signal, as said decoded first clock signal and said decoded second clock signal, to all said cells in the respective column following the occurrence of a specific and unique combination of inputs to said second combination of buffer means; and sensing means for sensing the states of said read output line and said data control line and for providing a logic data output signal which is a first logic state signal when said read output line and said data control line is in the same state, and is a second logic state when said read output line and said data control line are in opposite states.

21. The memory of claim 20 further comprised of a read/write generator means and a write driver means, said read/write generator being coupled to said plurality of X decoder means and being a means for receiving a read/write logic signal and for providing a write command signal to said X decoder means upon the occurrence of said write logic signal, said write driver means being a means for receiving a data input logic signal and a signal from said data control line and for providing a write driver signal to said plurality of X decoder means, upon the occurrence of a timing signal, having one logic state when said data input logic signal and said data control line are at the same state, and another logic state when said data input logic signal and said data control line are in opposite states, each said X decoder means further being a means for coupling said write driver signal to said data sense line upon the occurrence of said write command signal following said occurrence of a specific and unique combination of inputs to said first combination of buffer means.

22. The memory of claim 20 further comprised of a voltage source means, said voltage source means being a means for providing an output voltage different from a predetermined voltage between the first and second voltages characteristic of predetermined logic states by an amount substantially equal to the threshold voltage of the MOS devices of said semiconductor memory, at least one of said means receiving a logic input signal having, as an input device, a first MOS device having a first and second region and an insulated gate, said first region being coupled to said output voltage of said voltage source means and said gate of said first MOS device being coupled to said logic input signal, whereby the voltage of said voltage source may compensate for threshold voltage variations in said MOS device to maintain the compatibility of the circuit receiving said logic input signal.

23. The memory of claim 22 wherein said voltage source is comprised of a second MOS device having first and second regions and an insulated gate, said second MOS device having its said first region coupled to a first power supply terminal, its said second region providing said output voltage of said voltage source and being coupled to said second power supply terminal through said load device, and its said gate coupled to a predetermined voltage.

24. The memory of claim 23 further comprised of a third MOS device and said load device is a fourth MOS device, each having first and second regions and an insulated gate, said first region of said second MOS device being coupled to said first power supply terminal through said third MOS device by being coupled to said second region of said third MOS device, said gate and said first region of said third MOS device being coupled to said first power supply terminal, said fourth MOS device having its said first region and its said gate coupled to said second region and said first region of said second MOS device respectively, and its said second region to a reference power supply voltage.

25. The memory of claim 23 further comprised of thrid and fourth MOS devices each having first and second regions and a gate, said first region of said third MOS device and said gates of said third and fourth MOS devices being coupled to a first power supply terminal, said second region of said third MOS device being coupled to said first region of said fourth MOS device device and to said gate of said second device to provide said predetermined voltage thereto, said second region of said fourth MOS device being coupled to said second power supply terminal.

26. The memory of claim 23 further comprised of a fifth MOS device and said load device is a sixth MOS device, each having first and second regions and an insulated gate, said first region of said second MOS device being coupled to said first power supply terminal through said fifth MOS device by being coupled to said second region of said fifth MOS device, said gate and said first region of said fifth MOS device being coupled to said first power supply terminal, said sixth MOS device having its said first region and its said gate coupled to said second region and said first region of said second MOS device respectively, and its said second region to a reference power supply voltage.

27. The memory of claim 20 wherein said sensing means is comprised of first and second MOS devices, each having first and second regions and an insulated gate, said first and second MOS devices having their first regions coupled together, said first MOS device having its second region coupled to said gate of said second MOS device, and said second MOS device having its said second region coupled to said gate of said first MOS device.

28. The memory of claim 27 further comprised of a coupling means, and means for simultaneously applying a first signal to said gate of said first MOS device responsive to the state of the one of said data control cells in an addressed column, and a second signal to said gate of said second MOS device responsive to the state of the one of said memory cells in an addressed column and an addressed row.

29. The memory of claim 20 further comprised of trigger means coupled to said read output line, said trigger means being a means for the sensing of the change of state of said read output line from a first state toward a second state and to provide a drive voltage to said read output line upon said sensing of the change to drive said read output line toward said second state.

30. The memory of claim 21 wherein said write driver means is comprised of first and second MOS devices, each having first and second regions and an insulated gate, said first and second MOS devices having their first regions coupled together, said first MOS device having its second region coupled to said gate of said second MOS device, and said second MOS device having its said second region coupled to said gate of said first MOS device.

31. The memory of claim 30 further comprised of a coupling means, and means for simultaneously applying a first signal to said gate of said first MOS device responsive to the state of the one of said data control cells in an addressed column, and a second signal to said gate of said second MOS device responsive to the state of said data input logic signal.

32. The memory of claim 20 further comprised of a delay means and coupling means, and wherein said X decoder means is a means for receiving a unique combination of outputs from a first group of said buffer means and for coupling said data sense line for that row to read output line following the occurrence of a specific and unique combination of inputs to said first group of buffer means, and upon the occurrence of a delayed clock signal, the output of said delay means being coupled to said X decoder means through said coupling means, said delay means being an additional cell means having a dynamic storage node and being responsive to said first clock signal to set said output of said delay means to a logic state opposite the logic state of its said storage node, and responsive to said second clock signal for setting the state of its said output into said storage node.

* * * * *